United States Patent
Kitaoka et al.

(10) Patent No.: US 9,534,569 B2
(45) Date of Patent: Jan. 3, 2017

(54) WORKING VEHICLE

(71) Applicant: KOMATSU LTD., Minato-ku, Tokyo (JP)

(72) Inventors: Hisato Kitaoka, Hitachinaka (JP); Toshimitsu Honda, Hitachinaka (JP); Toshiyuki Ohta, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 14/776,018

(22) PCT Filed: Apr. 22, 2015

(86) PCT No.: PCT/JP2015/062266
§ 371 (c)(1),
(2) Date: Sep. 14, 2015

(87) PCT Pub. No.: WO2015/156420
PCT Pub. Date: Oct. 15, 2015

(65) Prior Publication Data
US 2016/0312747 A1  Oct. 27, 2016

(51) Int. Cl.
*B60K 13/02*  (2006.01)
*F02M 35/02*  (2006.01)
*E02F 9/08*  (2006.01)

(52) U.S. Cl.
CPC .......... *F02M 35/0201* (2013.01); *B60K 13/02* (2013.01); *E02F 9/0858* (2013.01)

(58) Field of Classification Search
CPC ....... B60K 13/02; E02F 9/0858; F02M 3/0201
See application file for complete search history.

(56) References Cited

U.S. PATENT DOCUMENTS

| | | | | |
|---|---|---|---|---|
| 4,946,482 A | * | 8/1990 | Tamba | ................. F02M 35/022 123/41.58 |
| 6,295,953 B1 | * | 10/2001 | Ohsawa | ................... F01P 11/12 123/198 E |
| 2014/0116797 A1 | | 5/2014 | Hayashi et al. | |

FOREIGN PATENT DOCUMENTS

| | | |
|---|---|---|
| JP | S60-092764 U1 | 5/1985 |
| JP | H02-037257 U1 | 2/1990 |
| JP | H02-124222 U | 5/1990 |
| JP | H04-015391 B2 | 3/1992 |

(Continued)

OTHER PUBLICATIONS

International Search Report dated Jul. 21, 2015 from corresponding International Patent Application No. PCT/JP2015/062266, 8 pages.

(Continued)

*Primary Examiner* — John Walters
*Assistant Examiner* — James Triggs
(74) *Attorney, Agent, or Firm* — Fish & Richardson P.C.

(57) ABSTRACT

A working vehicle includes: an air cleaner provided with a vacuator; a planar portion located below the air cleaner; an emission receiver provided to the planar portion at a position right under the vacuator, the emission receiver being recessed downward while having an upper opening, the emission receiver including a bottom surface; and a discharge channel having a base end that is in communication with the emission receiver through a communication opening and a distal end that is opened to an outside of the working vehicle through a discharge port, the discharge channel having an inclined surface inclined downward from the communication opening toward discharge port.

7 Claims, 5 Drawing Sheets

(56) References Cited

FOREIGN PATENT DOCUMENTS

| | | |
|---|---|---|
| JP | 2000-263509 A | 9/2000 |
| JP | 2001-334822 A | 12/2001 |
| JP | 2002-89380 A | 3/2002 |
| JP | 2003-184670 A | 7/2003 |
| JP | 5363681 B1 | 12/2013 |
| JP | 2014-005630 | 1/2014 |

OTHER PUBLICATIONS

International Search Report dated Jul. 21, 2015 from corresponding International Patent Application No. PCT/JP2014/062266, 8 pages.

\* cited by examiner

VIEW IN DIRECTION OF ARROW A

FIG. 5

WORKING VEHICLE

CROSS-REFERENCE TO RELATED APPLICATIONS

This application claims priority to International Application No. PCT/JP2015/062266 filed on Apr. 22, 2015, the contents of which application are incorporated herein by reference in their entirety.

TECHNICAL FIELD

The present invention relates to a working vehicle.

BACKGROUND ART

It is typically known that an air cleaner for intake air for an engine, which is attached to a working vehicle such as a tractor and a hydraulic excavator, centrifugally separates dust or the like sucked with outer air to prevent adhesion of the dust to a filter element, and discharges the dust, which is collected in a bottom portion of a casing, from the bottom portion through a vacuator (see, for instance, Patent Literatures 1 and 2).

The air cleaner is housed in an engine compartment along with the engine. The dust from the vacuator of the air cleaner is discharged from the engine compartment through an inclined or pipe-shaped guide member provided in the engine compartment.

In some working vehicles, the air cleaner is attached outside the engine compartment due to limitations of an installation space in the engine compartment. In this case, dust from the vacuator is directly discharged outside as long as no obstacle is present below the air cleaner.

CITATION LIST

Patent Literature(s)

Patent Literature 1: JP-Y-2-124222
Patent Literature 2: JP-A-2002-89380

SUMMARY OF THE INVENTION

Problem(s) to be Solved by the Invention

However, in the working vehicles where the air cleaner is attached outside the engine compartment, a platform or the like for an operator or a maintenance person to stand may be located right under the air cleaner. In this case, a lower end of the vacuator, which projects downward from the air cleaner, is close to a planar portion (an upper surface) of the platform, so that emissions such as dust cannot be smoothly discharged when the lower end of the vacuator is clogged with snow accumulated on the planar portion.

Such a problem is also caused when a lower portion of the air cleaner is attached at a fender position at a side of the vehicle and thus the lower end of the vacuator is close to a planar portion such as a tire housing.

An object of the invention is to provide a working vehicle capable of smoothly discharging emissions through a vacuator irrespective of whether or not a planar portion is located below an air cleaner.

Means for Solving the Problem(s)

According to an aspect of the invention, a working vehicle includes: an air cleaner provided with a vacuator; a planar portion located below the air cleaner; an emission receiver provided to the planar portion at a position right under the vacuator, the emission receiver being recessed downward while having an upper opening, the emission receiver including a bottom surface; and a discharge channel having a base end that is in communication with the emission receiver through a communication opening and a distal end that is opened to an outside of the working vehicle through a discharge port, the discharge channel having an inclined surface inclined downward from the communication opening toward discharge port.

In the working vehicle of the above aspect, the emission receiver recessed downward from the planar portion is provided right under the vacuator of the air cleaner. Snow is thus prevented from being accumulated between the lower end of the vacuator and the planar portion, so that dust or the like can reliably fall in the emission receiver from the vacuator. The dust or the like fallen in the emission receiver then slides on the inclined surface of the discharge channel through the communication opening to be discharged outside through the discharge port.

In the above aspect, it is preferable that an inner periphery of the opening be provided with a tongue inclined toward the bottom surface of the emission receiver, and the communication opening be defined between a lower edge of the tongue and the bottom surface of the emission receiver.

In the above aspect, it is preferable that the tongue be in a shape of a plate, and the tongue be provided with a penetrating portion penetrating the tongue from top to bottom.

In the above aspect, the penetrating portion may be a round hole, and an inner diameter of the penetrating portion may be substantially as large as a height of the communication opening.

In the above aspect, the tongue provided with the penetrating portion may be a shape of a comb.

In the above aspect, it is preferable that the working vehicle further include a tire housing defining a fender, the air cleaner be attached to an attachment portion provided to the tire housing, the opening be provided to a platform defined by the planar portion adjacent to the attachment portion, and the emission receiver be wholly recessed into the tire housing.

In the above aspect, it is preferable that the planar portion be provided with a rise wall that surrounds the opening.

DESCRIPTION OF EMBODIMENT(S)

Schematic Overall Arrangement of Wheel Loader

Exemplary embodiment(s) of the invention will be described below with reference to the attached drawings.

Figure 1:
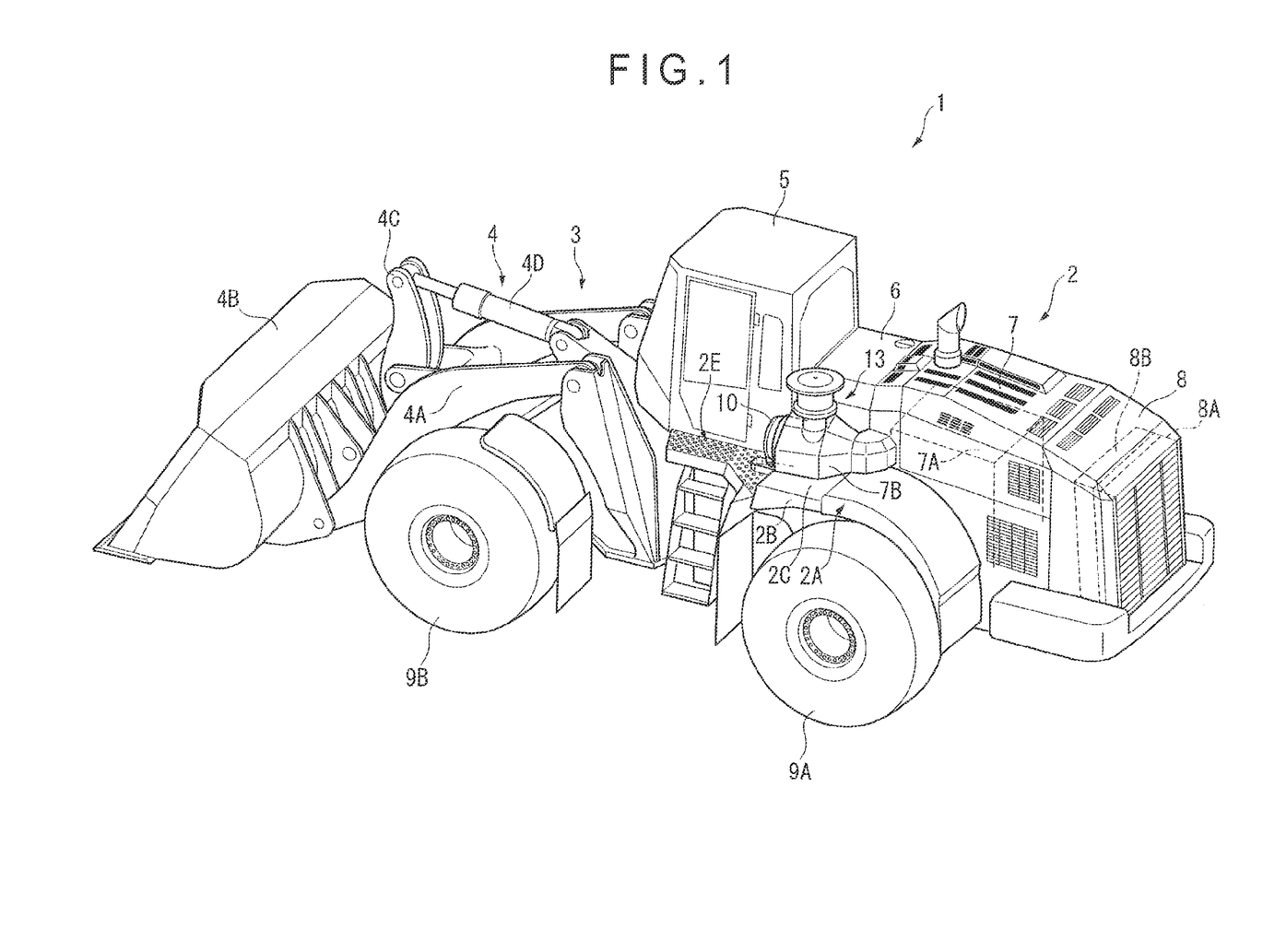
FIG. 1 is an overall perspective view showing a working vehicle according to an exemplary embodiment of the invention.

FIG. 1 is an overall perspective view showing a wheel loader 1 (a working vehicle) according to an exemplary embodiment. As shown in FIG. 1, the wheel loader 1 includes a rear vehicle body 2 located at a rear side in a vehicle-front-rear direction, a front vehicle body 3 located at a front side and swingably attached to the rear vehicle body 2 with a vertical articulation pin (not shown), and working equipment 4 provided to the front vehicle body 3. It should be noted that the terms "front" and "rear" respectively mean "front" and "rear" in the vehicle-front-rear direction hereinbelow unless any particular explanation is given. Similarly, the terms "upstream" and "downstream" respectively mean "upstream" and "downstream" in the vehicle-front-rear direction hereinbelow unless any particular explanation is given.

A cab 5 where an operator is to be seated is provided to the rear vehicle body 2 at a position near the front vehicle body 3. A hydraulic oil tank compartment 6 is provided at a rear side of the cab 5. An engine compartment 7 where an engine 7A is housed is provided at a rear side of the hydraulic oil tank compartment 6. A cooling compartment 8 where a cooling fan 8A and a radiator 8B are housed is provided at a rear side of the engine compartment 7. Right and left rear wheels 9A (only the left rear wheel is shown) driven by an engine output transmitted through a transmission are provided at both sides in a vehicle-width direction of the rear vehicle body 2.

An air cleaner 10 for cleaning intake air for the engine 7A is located outside the engine compartment 7 at a left side of the engine compartment 7.

The working equipment 4 of the front vehicle body 3 includes a right and left pair of booms 4A each having an end vertically pivotally supported on a frame of the front vehicle body 3, a bucket 4B pivotally supported on distal ends of the booms 4A, and a bell crank 4C pivotally supported on a cross member connecting the booms 4A. The booms 4A are actuated by hydraulic boom cylinders (not shown) to vertically move the bucket 4B. The hydraulic boom cylinders have front ends pivotally supported on substantially the middle of the booms 4A and rear ends pivotally supported on the frame of the front vehicle body 3. The bell crank 4C is actuated by a hydraulic bucket cylinder 4D to tilt the bucket 4B through a tilt lever (not shown) connected to a lower portion of the bell crank 4C (a lower portion in the attitude shown in FIG. 1). The bucket cylinder 4D has a front end pivotally supported on an upper portion of the bell crank 4C (an upper portion in the attitude shown in FIG. 1) and a rear end pivotally supported on the frame of the front vehicle body 3.

A hydraulic oil is delivered to the boom cylinder and the bucket cylinder 4D from the hydraulic oil tank compartment 6 and returned to the hydraulic oil tank compartment 6.

Right and left front wheels 9B (only the left front wheel is shown) driven by an engine output in the same manner as the rear wheels 9A are provided to the front vehicle body 3.

Schematic Description of Air Cleaner and Surroundings Thereof

The air cleaner 10, which includes a cylindrical casing 11 and a filter element (not shown) housed in the casing 11, is covered by a cover 7B except a front end thereof in the exemplary embodiment. Similarly to a typical device, the air cleaner 10 is configured to take outer air thereinto along a direction deviated from an axis of the casing 11 (i.e., a tangent direction to an outer circumference of the casing 11) to cause centrifugal separation in the casing 11, and discharge dust or the like removed from the outer air through the centrifugal separation to the outside. An exposed portion of the casing 11 uncovered by the cover 7B is thus provided with a vacuator 12 that projects downward.

The air cleaner 10 of the exemplary embodiment is also provided with an air-intake extension 13 extending upward from the cover 7B. The air-intake extension 13 allows for separation of large dust or the like before it enters the casing 11.

It should be noted that the exposed portion of the casing 11 uncovered by the cover 7B is configured as a cover member 14 (FIG. 2) removably attached to a casing body. When the cover member 14 is removed, the filter element housed in the casing 11 can be replaced.

Figure 2:
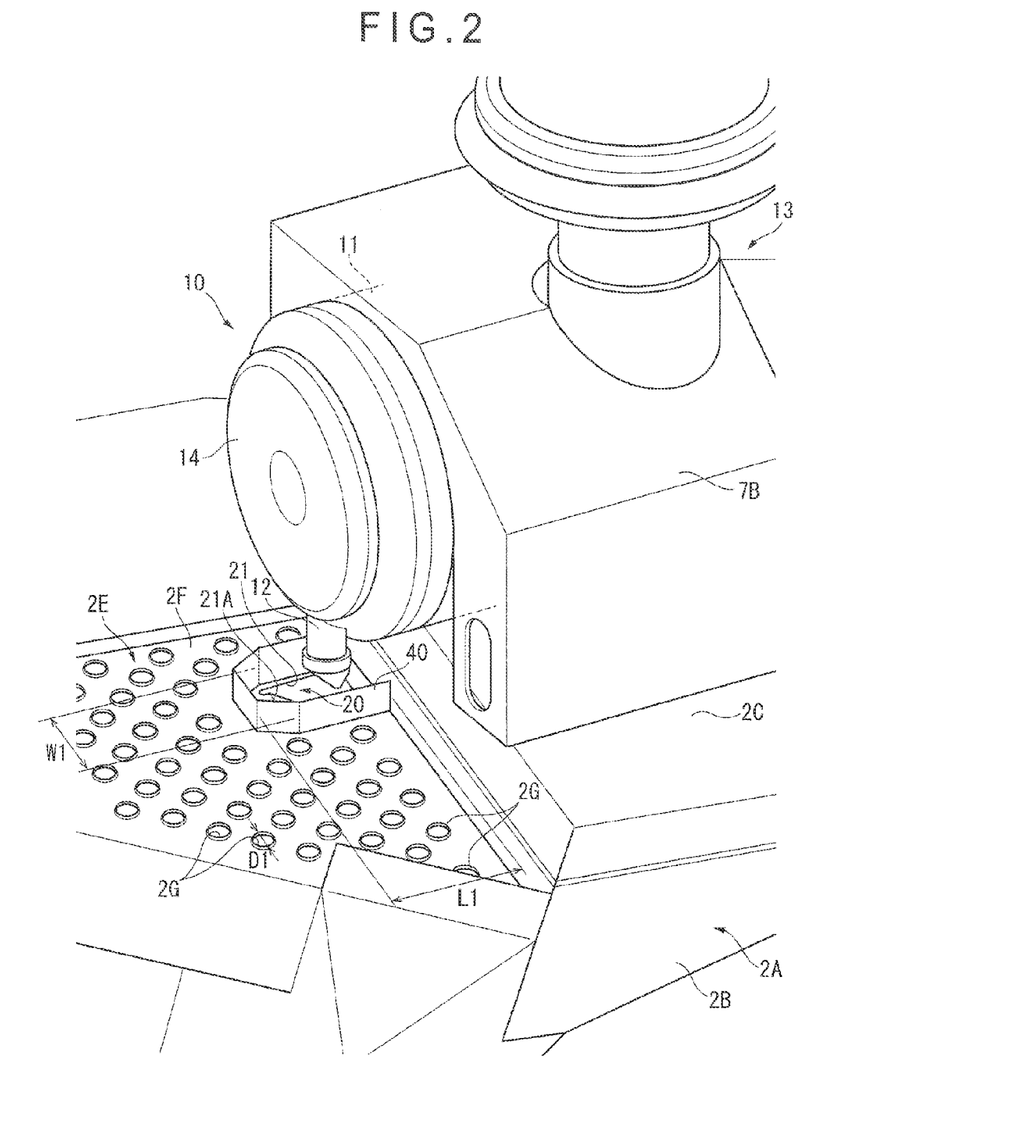
FIG. 2 is a perspective view showing a relevant part of the working vehicle.
Figure 3:
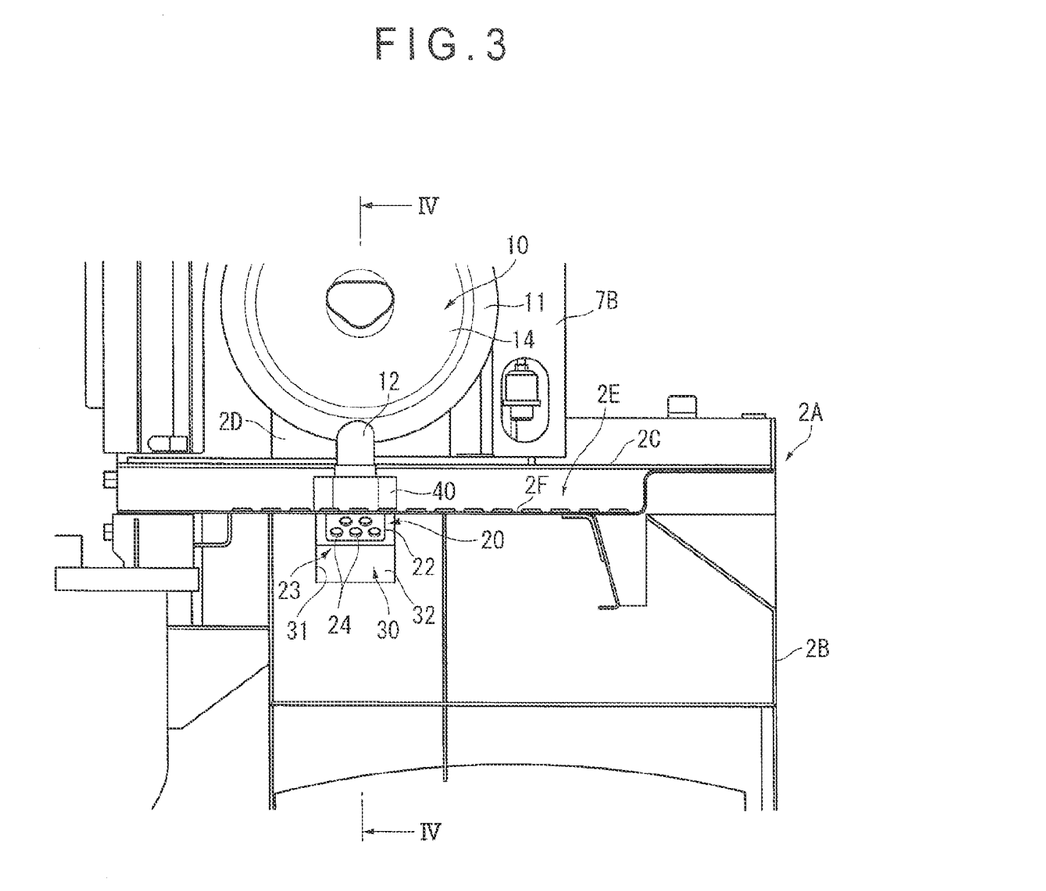
FIG. 3 shows the relevant part as viewed from a front side of the vehicle in a direction of an arrow III in FIG. 4.
Figure 4:
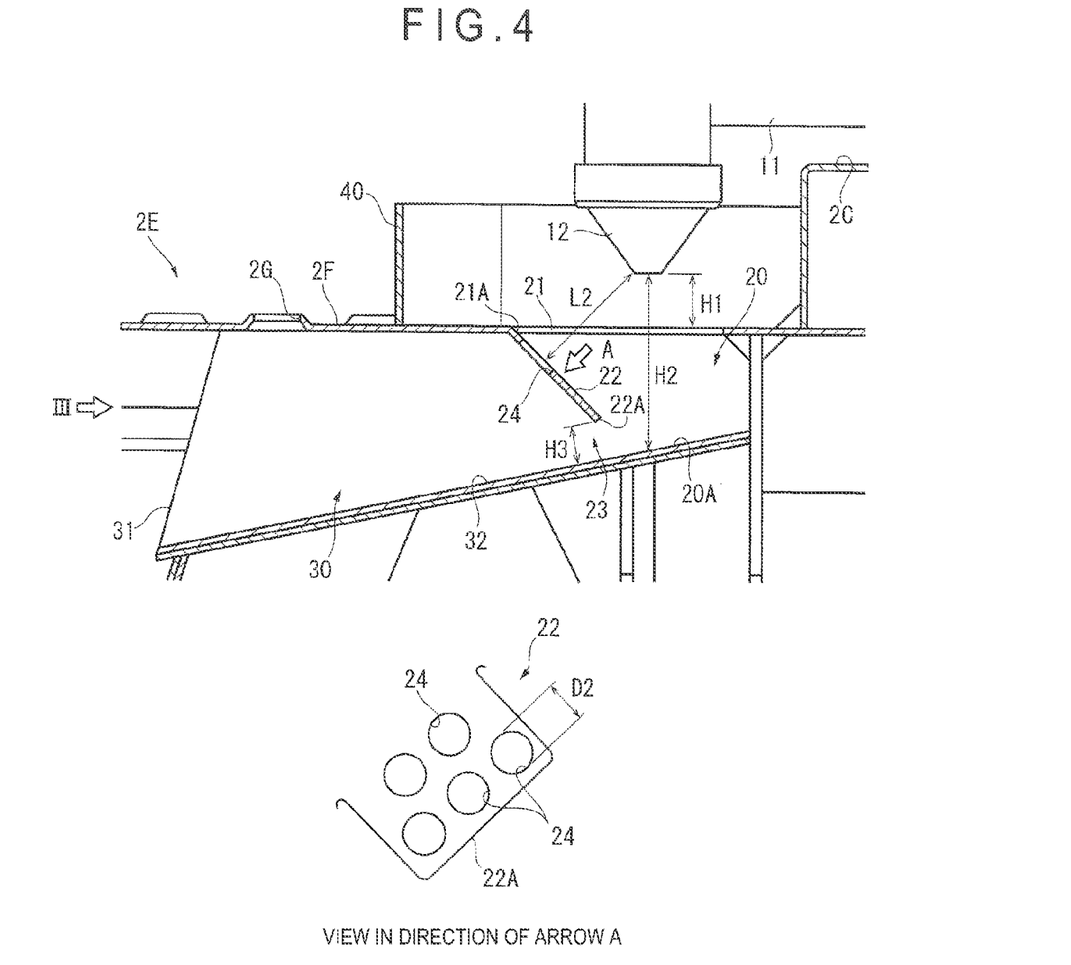
FIG. 4 is a sectional view showing the relevant part as viewed from a lateral side of the vehicle in a direction of arrows IV-IV in FIG. 3.

FIG. 2 is a perspective view showing a relevant part of the working vehicle. FIG. 3 shows the relevant part as viewed from a front side of the vehicle in a direction of an arrow III in FIG. 4. FIG. 4 is a sectional view showing the relevant part as viewed from a lateral side of the vehicle in a direction of arrows IV-IV in FIG. 3.

As shown in FIGS. 2 to 4, the rear vehicle body 2 is provided with a tire housing 2B defining a fender 2A, an upper portion of which is defined as a substantially flat attachment portion 2C. The air cleaner 10 is attached to the attachment portion 2C by the intermediary of an attachment stay 2D (FIG. 3).

A platform 2E is provided at a front side of the attachment portion 2C with a rear end thereof being located above the tire housing 2B. The platform 2E has an upper surface configured as a planar portion 2F recessed relative to the attachment portion 2C. The planar portion 2F is provided with a lot of anti-slip holes 2G by a curling process, the anti-slip holes 2G each having an upwardly protruding periphery and penetrating the planar portion 2F from top to bottom. The anti-slip holes 2G are intended to prevent an operator or a maintenance person working on the platform 2E from slipping on the planar portion 2F. In consideration of a case where an operator or a maintenance person works below the platform 2E, an inner diameter D1 of the anti-slip holes 2G is appropriately determined so that a foreign substance having a predetermined size or more is prevented from falling through the anti-slip holes 2G, and may be approximately 18 mm in the exemplary embodiment.

An emission receiver 20 is provided to the planar portion 2F of the platform 2E at a position right under the vacuator 12.

Since a lower end of the vacuator 12 is located close to the planar portion 2F, a typical arrangement entails a problem that dust cannot be discharged through the vacuator 12 due to snow accumulated therebetween. Accordingly, in the exemplary embodiment, the emission receiver 20 is provided to solve such a problem. The emission receiver 20 will be described in detail below.

Description of Emission receiver

As shown in FIGS. 2 to 4, the emission receiver 20 is wholly recessed into the tire housing 2B located therebelow and has an opening 21 opened at the same level as the planar portion 2F. The emission receiver 20 includes a bottom surface 20A. A front inner periphery 21A of the opening 21 is provided with a tongue 22 in the shape of a rectangular plate inclined toward the bottom surface 20A of the emission receiver 20. A communication opening 23 is defined between a lower edge 22A of the tongue 22 and the bottom surface 20A. The tongue 22 is provided with a plurality of through holes 24 (a penetrating portion) penetrating the tongue 22 from top to bottom.

The communication opening 23 is connected to a base end of a duct-shaped discharge channel 30 opened to the outside through a discharge port 31. The discharge port 31 is defined in a front surface of the tire housing 2B and below the platform 2E. The discharge channel 30 and the emission receiver 20 are in communication with each other through the communication opening 23 and, consequently, the emission receiver 20 is in communication with the outside of the vehicle through the communication opening 23 and the discharge port 31.

A bottom surface of the discharge channel 30 is configured as an inclined surface 32 extending downward from the communication opening 23 toward the discharge port 31. In the exemplary embodiment, the bottom surface 20A of the emission receiver 20 is also inclined to be continuous with the inclined surface 32. Dust fallen in the emission receiver 20 slides on the inclined surface 32 to be discharged outside. Since the discharge port 31 is defined in the front surface of the tire housing 2B, dirt and the like splattered by the rear wheel 9A rotating under the tire housing 2B does not enter the discharge port 31.

A rise wall 40 with a predetermined height is provided on the planar portion 2F to surround the opening 21 of the emission receiver 20. In the exemplary embodiment, the rise wall 40 is in a hexagonal shape in a plan view in combination with a step surface defined between the planar portion 2F and the attachment portion 2C located behind the planar portion 2F. It should be noted that the rise wall 40 may be in any shape different from the above, such as a rectangular shape or a semi-oblong shape (semi-oblong hole shape) in a plan view. The rise wall 40 prevents a foreign substance from entering the opening 21 from the outside.

Now, approximate dimension values of the components will be described.

In FIG. 2, a longitudinal length L1 of the rise wall 40 is approximately 155 mm, and a width W1 thereof is approximately 110 mm. In FIG. 4, a height H1 from the opening 21 of the emission receiver 20 to the lower end of the vacuator 12 is approximately 23 mm. A height H2 from the bottom surface 20A of the emission receiver 20 to the lower end of the vacuator 12 is approximately 72 mm. A distance L2 from the tongue 22 to the lower end of the vacuator 12 is approximately 50 mm.

The dimensions L1, L2, H1, H2 and W1 are appropriately determined so that a hand can be inserted into the emission receiver 20 through the opening 21 from near the vacuator 12 and the inserted hand can easily reach the bottom surface 20A to remove a foreign substance remaining without being discharged outside from the emission receiver 20.

A projecting amount of the whole of the emission receiver 20 and the discharge channel 30 from the planar portion 2F into the tire housing 2B therebelow is not specifically limited, but should be appropriately determined in consideration of the upward projection of the rear wheel 9A and an inclination of the whole of the vehicle relative to the rear wheel 9A during travelling or operation so that the emission receiver 20 and the discharge channel 30 are prevented from interfering with the rear wheel 9A even when a relative distance from the emission receiver 20 and the discharge channel 30 to the rear wheel 9A is reduced.

As shown in FIG. 4, similarly to the inner diameter D1 of the anti-slip holes 2G of the planar portion 2F, an inner diameter D2 of the through holes 24 provided to the tongue 22 is approximately 18 mm. Therefore, when a foreign substance having the predetermined size or more enters the emission receiver 20 over the rise wall 40 along the tongue 22, the foreign substance does not fall through the through holes 24 but remains in the emission receiver 20 without being discharged outside until an operator or a maintenance person removes the foreign substance. In contrast, a foreign substance smaller than the predetermined size falls through the through holes 24 to the inclined surface 32 of the discharge channel 30, and is discharged outside through the discharge port 31.

Similarly, a height of the lower edge 22A of the tongue 22 defined in a direction orthogonal to the inclined bottom surface 20A (i.e., a height H3 of the communication opening 23) is also approximately 18 mm. A foreign substance having the predetermined size or more remaining in the emission receiver 20 is thus reliably prevented from being discharged from the emission receiver 20.

Advantage(s) of Exemplary Embodiment(s)

In the exemplary embodiment, the emission receiver 20 is provided right under the vacuator 12 of the air cleaner 10, the emission receiver 20 being recessed downward from the planar portion 2F and including the bottom surface 20A. Snow is thus prevented from being accumulated between the lower end of the vacuator 12 and the planar portion 2F of the platform 2E, so that dust or the like can reliably fall in the emission receiver 20 from the vacuator 12. The dust or the like fallen in the emission receiver 20 then slides on the inclined surface 32 of the discharge channel 30 through the communication opening 23 to be smoothly discharged outside through the discharge port 31.

Modification(s)

Incidentally, it should be understood that the scope of the invention is not limited to the above-described exemplary embodiment(s) but includes modifications and improvements compatible with the invention.

Figure 5:
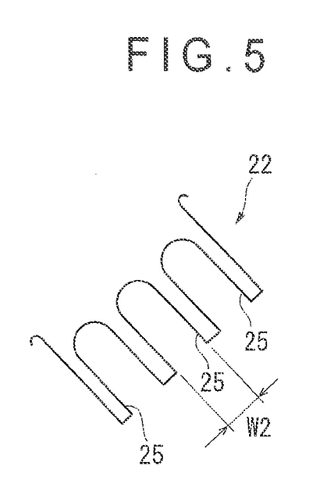
FIG. 5 shows a modification of the present invention.

For instance, the penetrating portion of the tongue 22 is in the form of the round through holes 24 in the exemplary embodiment, but may alternatively be in the form of oblong slits 25 (oblong holes) as shown in FIG. 5. In this case, the tongue 22 may be in the shape of a comb as a whole. A width W2 of the slits 25 is appropriately determined so that a foreign substance having the predetermined size or more is prevented from falling through the slits 25.

It may be determined as desired in the practice of the invention whether or not the air cleaner according to the invention is attached to the tire housing of the fender and whether or not the emission receiver is attached to the platform. The air cleaner and the emission receiver may be attached to different parts without departing from the scope of the invention. For instance, the lower end of the vacuator may be close to a planar portion of any part.

The tongue and the rise wall are provided if necessary and may be omitted.

The invention is applicable to not only a wheel loader but also any other working vehicles such as a dump truck, a bulldozer, a motor grader, a tractor and a hydraulic excavator.

The invention claimed is:
1. A working vehicle comprising:
an air cleaner provided with a vacuator;
a planar portion located below the air cleaner;
an emission receiver provided to the planar portion at a position under the vacuator, the emission receiver being recessed while having an upper opening, the emission receiver comprising a bottom surface; and
a discharge channel having a base end that is in communication with the emission receiver through a communication opening and a distal end that is opened to an outside of the working vehicle through a discharge port, the discharge channel comprising an inclined surface inclined downward from the communication opening toward discharge port, wherein an inner periphery of the opening is provided with a tongue inclined toward the bottom surface of the emission receiver, and the communication opening is defined between a lower edge of the tongue and the bottom surface of the emission receiver.

2. The working vehicle according to claim 1, wherein the tongue is provided with a penetrating portion penetrating the tongue from top to bottom.

3. The working vehicle according to claim 2, wherein the penetrating portion is a round hole, and an inner diameter of the penetrating portion is substantially as large as a height of the communication opening.

4. The working vehicle according to claim 2, wherein the tongue provided with the penetrating portion is a shape of a comb.

5. The working vehicle according to claim 1, wherein the working vehicle further comprises a tire housing defining a fender, the air cleaner is attached to an attachment portion provided to the tire housing, the opening is provided to a platform defined by the planar portion adjacent to the attachment portion, and the emission receiver is wholly recessed into the tire housing.

6. The working vehicle according to claim 1, wherein the planar portion is provided with a wall that surrounds the opening.

7. The working vehicle according to claim 1, wherein the tongue comprises a rectangular plate.

\* \* \* \* \*